United States Patent
Miller

(10) Patent No.: US 6,186,096 B1
(45) Date of Patent: Feb. 13, 2001

(54) PET CHEW WITH DISPENSABLE FOOD PRODUCT

(76) Inventor: Keith Miller, 612 FairHill Rd., Hatfield, PA (US) 19440

(*) Notice: Under 35 U.S.C. 154(b), the term of this patent shall be extended for 0 days.

(21) Appl. No.: 09/571,517

(22) Filed: May 16, 2000

(51) Int. Cl.⁷ .................................................. A01K 29/00
(52) U.S. Cl. ............................................................ 119/709
(58) Field of Search .................................. 119/702, 707, 119/708, 709, 710, 711; 446/475

(56) References Cited

U.S. PATENT DOCUMENTS

| | | | |
|---|---|---|---|
| 2,086,631 | * 7/1937 | Munro | 110/702 |
| 2,131,229 | * 9/1938 | McMennamin | 119/702 |
| 5,957,082 | * 9/1999 | Budman et al. | 119/54 |

* cited by examiner

Primary Examiner—Thomas Price

(74) Attorney, Agent, or Firm—Gregory J. Gore

(57) ABSTRACT

A pet chew toy is generally bone-shaped having an elongated body member with a bulbous knob at each end. The body member has a hollow cavity along its axis and an opening at one end. A screw rod is positioned along an axis of the body member and is affixed to the one knob located at the end opposite the cavity opening. A hard chewable food product which has a non-circular cross-section that corresponds to the shape of the cavity is threaded onto the screw rod. An internal bore within the food product includes internal threads which are compatible with the threads of the screw rod. The chew product may also be of a soft enough material that it is self-threading, that is to say that, the screw rod creates thread in a smooth internal bore of the food product when it is initial introduced into the body member. When the two opposing knobs are rotated with respect to each other the screw rod is turned. Because the chew product is prevented from turning along with the screw rod, this rotation of the screw rod advances or draws-in the formed chew product which projects from an opening in one end of the body member as desired by the pet owner.

6 Claims, 2 Drawing Sheets

PET CHEW WITH DISPENSABLE FOOD PRODUCT

FIELD OF THE INVENTION

The present invention relates to animal chew toys and chewable animal food products. More particularly, it relates to a pet chew toy where the chew toy holds, protects and dispenses a food substance or similar material attractive to the pet. This application is related disclosure document number 468958.

BACKGROUND OF THE INVENTION AND PRIOR ART

Pets often like to play with objects of all kinds, some they chew and consume in part or entirely. Artificial bones, teething toys, etc., which contain components for exciting the animal's interest and chewing instincts are well known in the art. Dogs, in particular, like to chew on household objects or manufactured pet products, as their owner may intentionally or casually have set them aside for this use.

Accordingly, it is common in the art to manufacture chewable products that are chewed, consumed and digested by pets. The chew product is manufactured with various materials that result in a range of hardness. The level of hardness corresponds to the jaw strength of the pet and the amount of time it takes the pet to tear apart and consume the chew product. Chewable objects perform a number of useful functions for pets. They provide exercise for the pets' jaw muscles, they massage the pets' gums and thus clean the pets' teeth and they provide relief during periods of tooth eruption when animals, specifically puppies, are teething. Chewable objects also provide entertainment for occupying the pets' attention. It is often the case that dogs instinctively consume, in part or in whole, objects that are not beneficial to the health of the animal. Even certain pet products for dogs, can be detrimental to the dog when larger pieces are torn apart and consumed.

A variety of chew toys and chew products have been manufactured for the entertainment of pets. These chew toys and chew products are made from a variety of material. For example, rawhide, woven fabrics, plastic or rope have been used but they are subject to breakdown from continued chewing and may also cause digestive problems if large or sharp pieces are swallowed. Softer chew toys and chew products cannot be used for the pets' entertainment while the pet is unattended for extended periods since, by instinct, pets will consume the pieces. More stable materials, such as rubber or plastic have also been used for such chewable objects but frequently these materials have undesirable tastes and quickly loose the attention of the pet. A variety of methods have been developed to impregnate chewable objects with odor or flavor extracts or animal meals. These products have limited success in exciting the pet into chewing a chew toy manufactured with undesirable materials.

More specifically, there exists several chew toys, such as "The Kong"™, that have opening(s) manufactured as part of the chew toy that are marketed to hold animal food items, particularly dog biscuits, for the enjoyment of the pet. The food item and the chew toy is not an integral system and the food item is usually consumed quickly, which significantly limits its entertainment value to the pet.

A chew toy called the "Goodie Ship"™ manufactured by Planet Pet™ includes star-shaped receptacles for small dog biscuits, called "Goodie Grippers"™. These biscuit grippers have a slight advantage over the hole in "The Kong"™ by holding the food product a little more securely using flexible, rubber flanges within the hole. However, this technique is limited to small dog biscuits and the biscuits are relatively easy for the pet to remove from the grippers. The chew toy and the chew product are not an integral system allowing the pet owner to determine the amount of chew product that the pet may have as well as the hardness of the chew product.

However, no prior art pet chew product enables the pet owner to leave the chew product with the pet without the fear of the pet quickly consuming the entire chew product. Furthermore, no prior art product enables the pet owner to use chew products that are coated with flavorings, since they often stain the floors and rugs of the pet owner. To date it has not been known in the art to manufacture an integral system consisting of both the chew toy and the chew products.

The most pertinent patent prior art of which the applicant is aware includes U.S. Pat. No. 5,947,061 issued to Markham et al, dated Sep. 7, 1999; U.S. Pat. No. 5,819,690 issued to Brown, dated Oct. 13, 1998; U.S. Pat. No. 5,813,366 issued to Mauldin, Jr., dated Sep. 29, 1998; U.S. Pat. No. 5,673,653 issued to Sherrill, dated Oct. 7, 1997; U.S. Pat. No. 5,865,146 issued to Markham, dated Feb. 2, 1999; U.S. Pat. No. 5,619,954 issued to Rotondi, dated Apr. 15, 1997; U.S. Pat. No. 2,003,958 issued to M. B. Salisbury, dated Jun. 4, 1935; U.S. Pat. No. 5,832,877 issued to Markham, dated Nov. 10, 1998; U.S. Pat. No. 5,174,243 issued to O'Rourke, dated Dec. 29, 1992; U.S. Pat. No. 5,799,616 issued to McClung, III, dated Sep. 1, 1998; and U.S. Pat. No. 5,965,182 issued to Lindgren, dated Oct. 12, 1999.

U.S. Pat. No. 5,865,146 issued to Markham is particularly pertinent in that is discloses a chewable pet toy having an elongate hollow body with spaced apart first and second bulbous section. The hollow body may be filled with a food product which can be removed by the pet by biting down on the pet toy and deforming the side-wall, thus, the food product is self-dispensing and may be consumed at a rate determined by the amount of chewing of the animal. However, neither the Markham chewable pet toy nor any of the other prior art pet items known to the applicant provide the features and advantages of the present invention which represent a significant advance in the state of-the-art of chewable pet toys.

SUMMARY OF THE INVENTION

The present invention overcomes the disadvantages and shortcomings of the prior art by providing a non-edible chew toy that houses, protects and dispenses a digestible chew product as desired by the pet owner. This is achieved by the way in which the invention is manufactured, the way it is formed, and how the device is used by the pet owner.

The chew toy is generally bone-shaped having an elongated body member with a bulbous knob at each end. The body member has a hollow cavity along its axis and an opening at one end. A screw rod is positioned along an axis of the body member and is affixed to the one knob located at the end opposite the cavity opening. A hard chewable food product which has a non-circular cross-section that corresponds to the shape of the cavity is threaded onto the screw rod. An internal bore within the food product includes internal threads which are compatible with the threads of the screw rod. The chew product may also be of a soft enough material that it is self-threading, that is to say that, the screw rod creates thread in a smooth internal bore of the food product when it is initial introduced into the body member. When the two opposing knobs are rotated with respect to each other, the screw rod is turned. Because the chew product is prevented from turning along with the screw rod, this rotation of the screw rod advances or draws-in the formed chew product which projects from an opening in one end of the body member as desired by the pet owner.

Therefore, the principal object of the present invention is to provide an improved chew toy and chew product system. The chew toy should contain in whole the chew product and both should function as one unit. The chew toy and chew product may also function independently if desired. Yet another object of the present invention is to provide an improved chew toy and chew product system that occupies the pet for extended periods and will allow it to remain with the pet for any length of time unattended without fear of the pet eating the whole chew product causing harm to the pet or spoiling their appetite by consuming too much of the chew product. And finally, although carpets and other floor surfaces are not protected entirely by the present device, the degree of staining is substantially reduced.

Further objects and advantages of the invention will be apparent to those skilled in the art from the following detailed description thereof, taken in conjunction with the drawings.

DESCRIPTION OF THE PREFERRED EMBODIMENT

Figure 1:
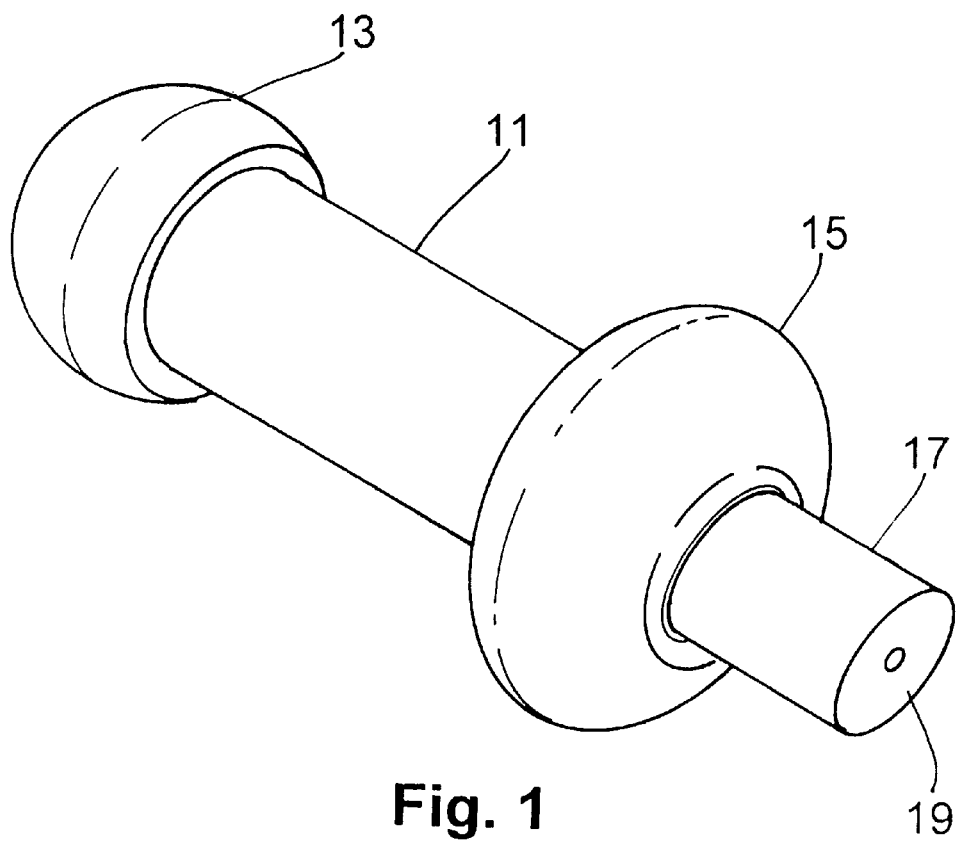
FIG. 1 is a top, left front perspective view of the present invention.

Referring now to FIG. 1, the basic structure of the present invention is shown. An elongate body member 11 includes two bulbous knobs 13 and 15 at opposite ends. A chewable food product 17 extends from the cavity within the body member through an opening at one end. The food product is relatively hard so that it can function structurally, as further described herein. For example, the food product includes a threaded internal bore 19 which cooperates with screw rod to advance or withdraw the food product from within the main body.

Figure 2:
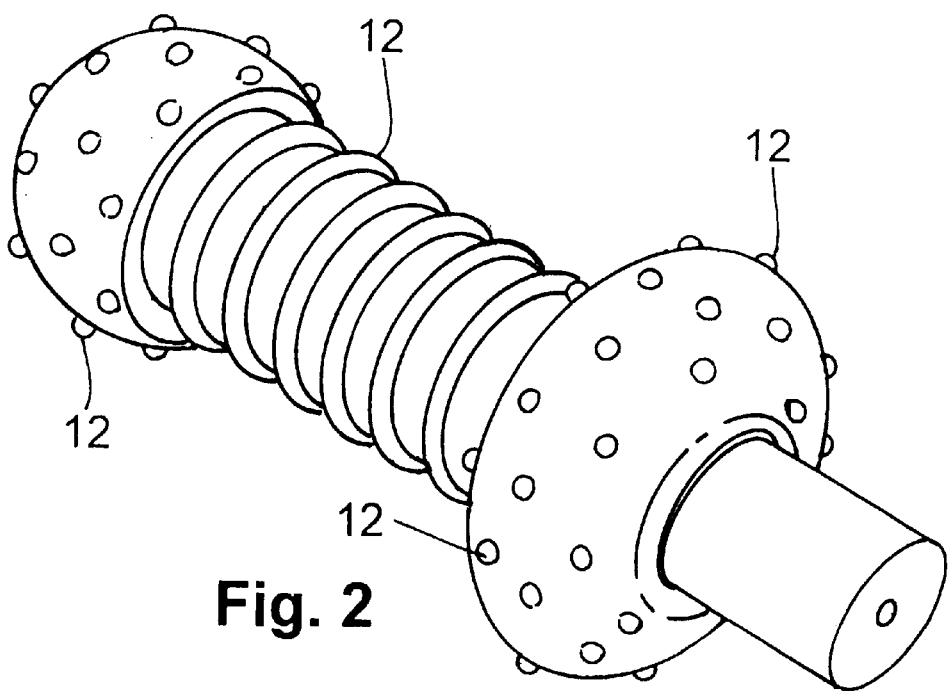
FIG. 2 is a top, left front perspective view of an alternate embodiment.

FIG. 2 shows an alternate embodiment of the invention whereby the outside surface includes ridges and the bulbous knobs include optional protrusions to provide surface elements 12 which are stimulating to the mouth of the pet. Internally, the embodiment shown in FIG. 2 is the same as the generic embodiment shown in FIG. 1 which will now be described in further detail with regard to FIGS. 3–6.

Figure 3:
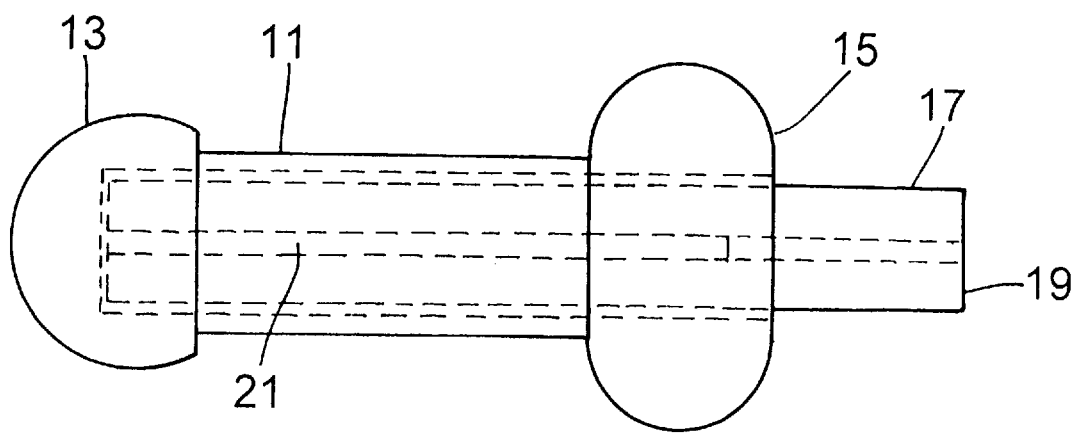
FIG. 3 is a left side elevation view of the embodiment shown in FIG. 1.

Referring now to FIG. 3, a side view of the present invention of FIG. 1 is shown. Food product 17 resides within a cavity within the main body of the present invention. Knobs 13 and 15 are located at each end and the food product projects from an opening in a larger diameter knob 15. The food product includes a central bore 19 which is threadably affixed to an internal screw rod 21. The screw rod is rigidly affixed to knob 13 at one end. Affixation may be accomplished by any suitable means. As will be more clearly shown with regard to FIG. 4, the internal bore of the food product includes internal threads which mate with the threads of the screw knob.

Figure 4:
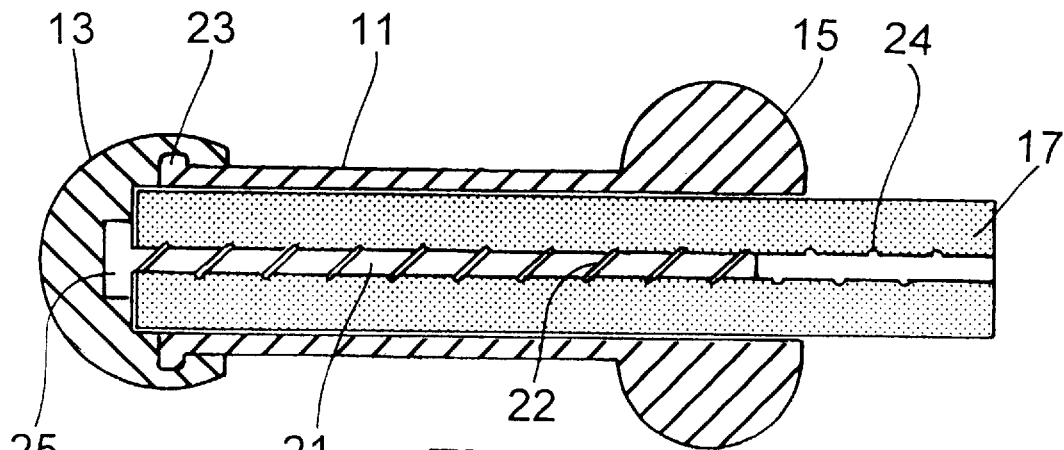
FIG. 4 is a side sectional view taken from FIG. 1 as shown in that figure.

Referring now to FIG. 4, a sectional view of FIG. 3, shows more clearly the mechanical relations between the parts of the present invention. The main body 11 of the chewable toy of the present invention is integral with the larger knob 15. The smaller knob 13 is rotatably affixed to the to the main body by means of a flange 23 at the end of a substantially cylindrical portion the main body which is opposite to the end having the larger knob. The screw rod 21 is rigidly affixed at its end 25 to the smaller knob 13. The screw rod 21 lies along a central axis within a cavity of the main body and has external threads 22 which mate with threads 24 formed within the food product 17. The food product 17 is secured radially within the main body is provided by the closely fitting and non-circular shaping of the inside of the cavity and the exterior surface of the chew product. In the preferred embodiment, the chosen non-circular shape is elliptical and is more clearly shown in FIG. 5 which follows.

It will be readily understood from these relations by those of skill in the art, that because the food product 17 is secured radially with respect to the main body of the chew toy, rotation of knob 13 with respect to knob 15 will cause the food product to either extend from or withdraw from the main body depending upon the direction in which the knobs are turned.

Figure 5:
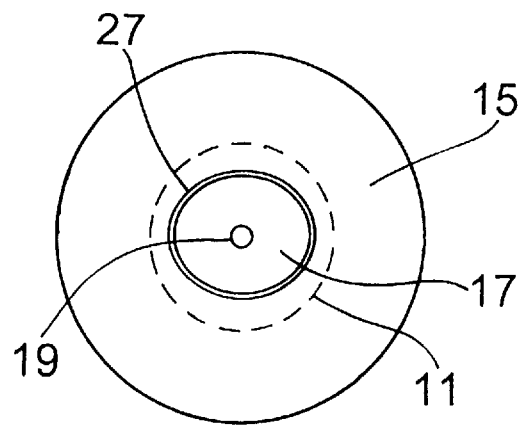
FIG. 5 is a front elevation view of the present invention.

Referring now to FIG. 5, an end view of the present invention from the right side is shown. This view which shows the elliptical external shape of the food product 17 which lies within a similarly dimensioned elliptical cavity 27 within the main body of the invention. While the preferred embodiment has an elliptical cavity which correspondence with an elliptical food product, other non-circular cross-section shapes may be employed so long as the food product fits closely enough within the cavity so that axial rotation of the food product with respect to the body of the invention is prevented. While the preferred embodiment depicts the direct threading engagement between the screw rod and the food product, it should be understood that the screw rod may be threaded into an intermediate element that is in turn affixed to the food product. The direct engagement provides the simplest and most economical form of the invention. However, for softer food products which may not be able forceably engage the threads of the screw rod, intermediate elements such as a threaded metal cap may be employed.

Many advantages over the prior art, for example the fact that the knobs are of different diameter, which it should be appreciated, would hold the food product at an upward extending angle if the main body of the invention were lying on a horizontal support surface. This means that the chew product would be held upwardly and away from the surface which would typically be household flooring that may include a carpet. Thus, the staining of the carpet or flooring is greatly reduced since the chew product would rarely come in contact with that surface. Other advantages will be seen in regard to the use of the present invention.

In use, the device is given to the dog to chew on with or without a chew product inserted. Either due to the natural playfulness of a particular dog, or due to the scent and taste of the chew product, or due to the dog's inability to break up the device and chew on the rest of the chew product, dogs tend to spend considerable time and effort chewing and gnawing on the device. The abstract bone-shaped configuration of the device is believed to contribute to its attraction to a dog. In addition, the contained chew product by its texture, odor, taste and relative softness substantially increases the device's attraction to the dog. As the exposed chew product is masticated and digested, the pet owner may manually expose an additional amount of chew product or may leave the chew device as is requiring the pet to focus its attention on extracting the remaining chew product. As the device is chewed upon, the device is contacted on many different angles and in many different orientations. This causes the many parts of the device to come in contact with most if not all surfaces of the dogs teeth. The dog thereby, in effect, cleans his own teeth to prevent tooth decay, while enjoying playing with the toy and masticating the chew product.

While a particular form of the invention has been illustrated and described, it will also be apparent to those skilled in the art that various modifications can be made without departing from the spirit and scope of the invention. For example, any type of food product may be used so long as it is hard enough to forceably react with the threads of the screw rod so that turning the screw expels the food product from the cavity opening. Furthermore, a variety of materials may be used so long as the pet chew is soft enough to be chewable, yet resist tearing and destruction by the pet. Finally, while knobs of different sizes are shown in the preferred embodiment should be well understood that these may be equally sized without effecting the function of the present invention universally. Accordingly, it is not intended that the invention be limited only by the appended claims and their legal equivalents.

What is claimed is:

1. A pet chew toy, comprising:
   an elongate main body having two bulbous knobs at opposite ends thereof, a first knob being integral with said main body and a second knob being rotatably affixed to said body;
   a cavity disposed substantially along a longitudinal axis of said body, said cavity extending through an end of said first knob forming an opening therein;
   an elongate screw rod rigidly affixed to said second knob and located along said axis within said cavity; and
   a food product located within said cavity threadably engaged with said screw rod whereby turning said second knob with respect to said body causes said food product to be selectively forced out of, or drawn into, said opening.

2. The pet chew toy of claim 1 wherein the external surface of said food product is closely fitted within said cavity and wherein the cross-sectional shape of said cavity and said food product is non-circular.

3. The pet chew toy of claim 1 wherein said food product includes a bore having internal threads compatible with the threads of said screw rod.

4. The pet chew toy of claim 1 wherein said main body is cylindrical.

5. The pet chew toy of claim 1 wherein said first knob has a diameter greater than said second knob.

6. The pet chew toy of claim 1 further including the plurality of outwardly protruding dental stimulation surface elements integral with said knobs and said main body.

* * * * *